No. 635,779. Patented Oct. 31, 1899.
W. S. HUNT & O. W. CLINE.
TAGGING AND MEASURING MACHINE.
(Application filed May 17, 1899.)
(No Model.) 2 Sheets—Sheet 1.
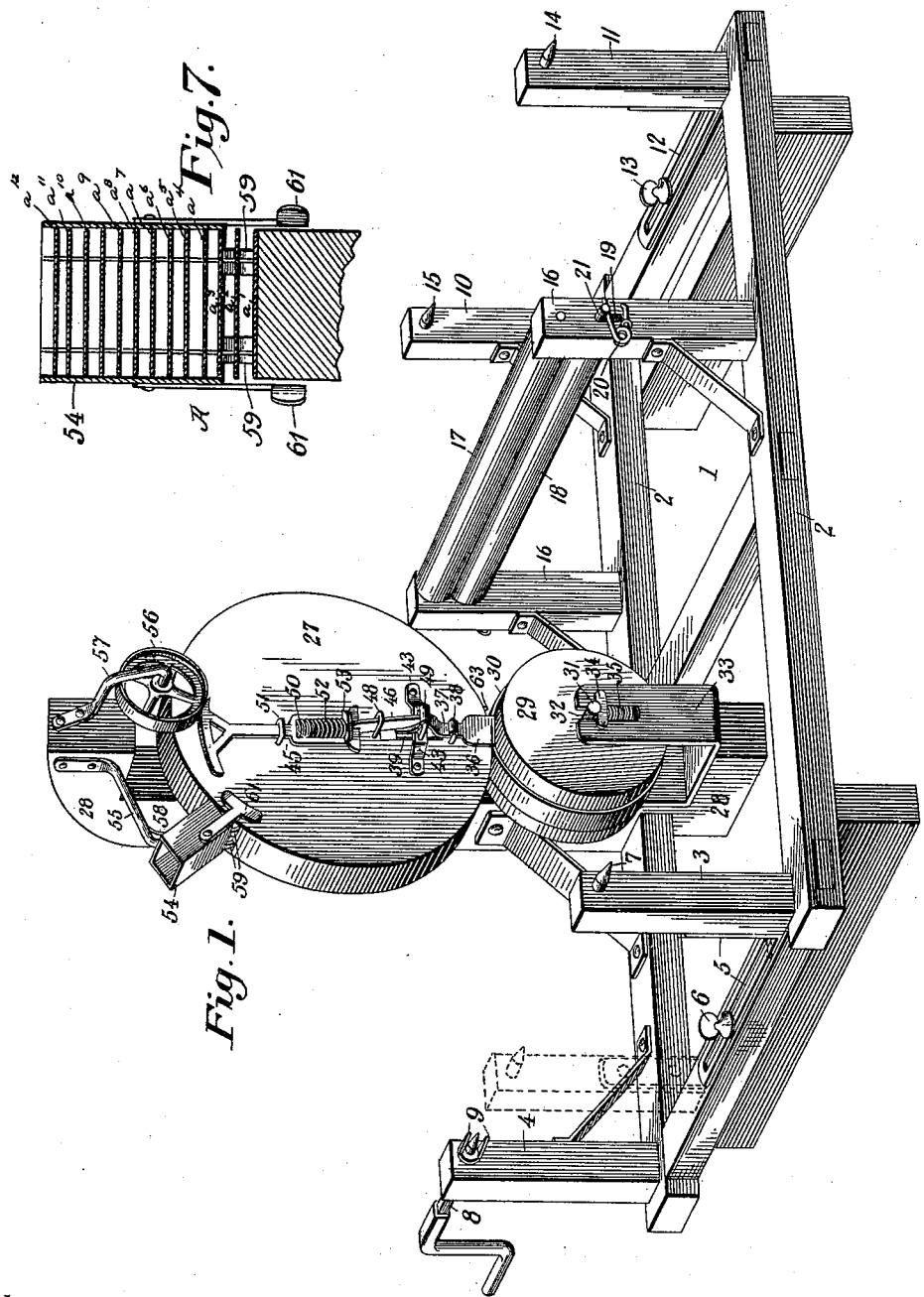
Witnesses
W. S. Hunt,
O. W. Cline, Inventors
By their Attorneys,
THE NORRIS PETERS CO., PHOTO-LITHO., WASHINGTON, D. C.

No. 635,779. Patented Oct. 31, 1899.
W. S. HUNT & O. W. CLINE.
TAGGING AND MEASURING MACHINE.
(Application filed May 17, 1899.)

(No Model.) 2 Sheets—Sheet 2.

Witnesses
W. S. Hunt,
O. W. Cline, Inventors
By their Attorneys,

UNITED STATES PATENT OFFICE.

WILLIAM S. HUNT AND ORIN W. CLINE, OF PILOT MOUND, IOWA.

TAGGING AND MEASURING MACHINE.

SPECIFICATION forming part of Letters Patent No. 635,779, dated October 31, 1899.

Application filed May 17, 1899. Serial No. 717,190. (No model.)

*To all whom it may concern:*

Be it known that we, WILLIAM S. HUNT and ORIN W. CLINE, citizens of the United States, residing at Pilot Mound, in the county of Boone and State of Iowa, have invented a new and useful Tagging, Measuring, and Numbering Machine, of which the following is a specification.

The invention relates to improvements in tagging, measuring, and numbering machines.

The object of the present invention is to improve the construction of machines for measuring woven fabrics and to provide a simple and comparatively inexpensive one designed to be employed in taking the account of stock and capable of accurately measuring and tagging all kinds of fabric from the heaviest carpets to the finest ribbons and laces and of enabling a merchant to tell at a glance the number of yards or other unit of measure contained in a bolt or roll of material.

The invention consists in the construction and novel combination and arrangement of parts hereinafter fully described, illustrated in the accompanying drawings, and pointed out in the claims hereto appended.

Figure 8:
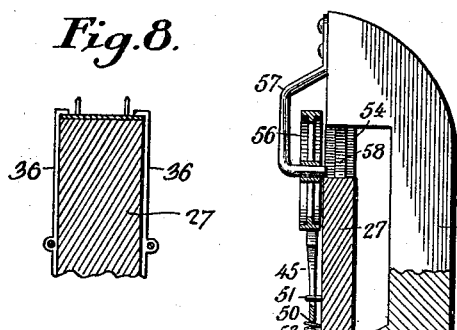
Figure 9:
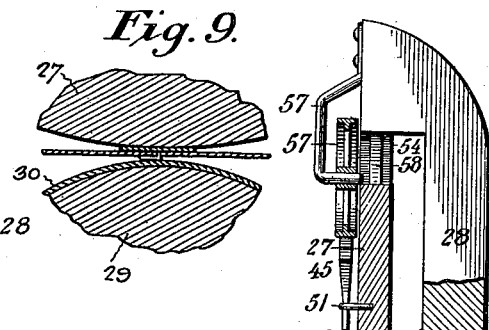
Figure 2:
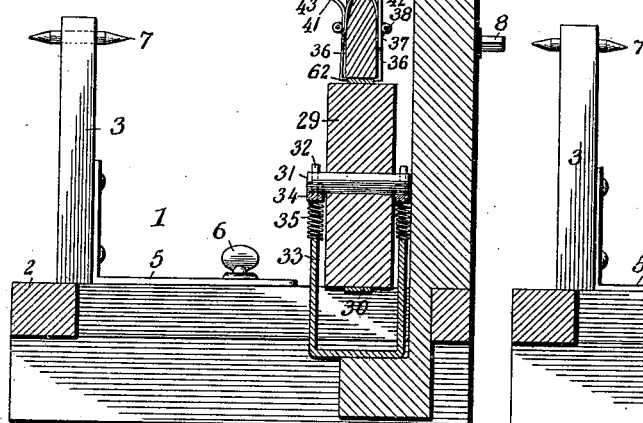
Figure 3:
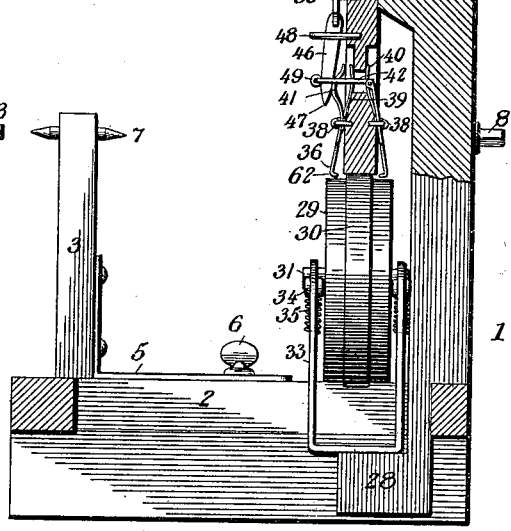
Figure 4:
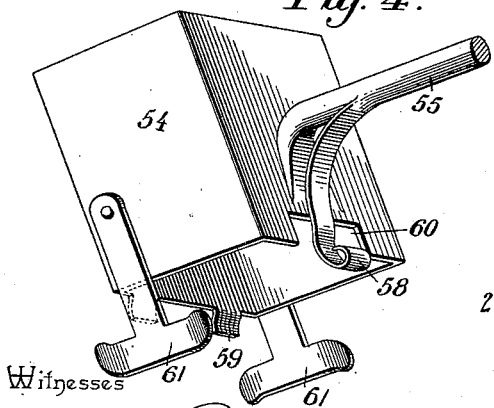
Figure 5:
Figure 6:
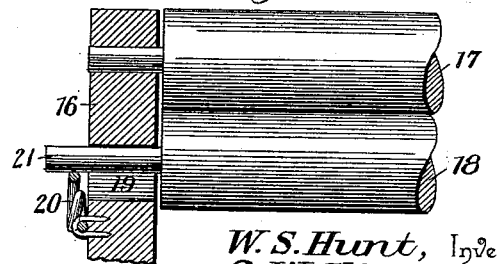

In the drawings, Figure 1 is a perspective view of a machine constructed in accordance with this invention. Fig. 2 is a transverse sectional view, the tag-holding jaws being located directly above the clenching-wheel. Fig. 3 is a similar view, the tag-holding jaws being held open by the tripping-wheel. Fig. 4 is a detail perspective view of the hopper or tag-receptacle. Fig. 5 is a detail perspective view of the spool-receiving spindle. Fig. 6 is a detail sectional view illustrating the manner of mounting the guide-rolls. Fig. 7 is a detail sectional view illustrating the arrangement of the tags within the hopper. Fig. 8 is a similar view of a portion of the measuring-wheel, showing the tag-engaging jaws in engagement with a tag. Fig. 9 is a detail sectional view showing a tag in clenching engagement with a fabric.

Like letters and numerals of reference designate corresponding parts in all the figures of the drawings.

1 designates a supporting-frame composed of a substantially rectangular base 2 and vertical standards arranged at the ends of the frame and at an intermediate point. The end standards 3 and 4 at the front of the machine are adapted to receive the spool or bolt of material measured and tagged, and in order to accommodate fabrics of different widths the standard 3 is adjustable, being provided at its lower end with a slotted arm 5, arranged on the base of the supporting-frame and receiving a clamping-screw 6, which secures the adjustable standard rigidly to the base. The adjustable standard is adapted to be arranged at either side of the clamping-screw to adapt the machine for measuring both wide material and narrow ribbons and laces, and it is provided at its upper end with pointed journals 7, adapted to be partially embedded in an end of the board of a roll of cloth or other material. The other end of such board is engaged by a winding-shaft 8, having its outer end squared for the reception of a crank-handle and having its inner end pointed and provided with pointed arms 9. The pointed arms 9, which are mounted on the short winding-shaft by means of a collar or plate, form a clutch and are adapted to grip the board of a bolt or roll securely. The end standards 10 and 11, which are located at the other end of the machine, are adapted to receive the bolt or roll to be measured. The standard 10 is fixed to the base, and the other standard 11 is adjustable similar to the standard 3 and is provided with a slotted arm 12, which is engaged by a clamping-screw 13. The adjustable standard is provided at its top with pointed journals 14, similar to those of the standard 3, and the fixed standard 10 is provided at its inner face with a pointed journal 15. These pointed journals permit a bolt or roll to revolve freely as it is unwound.

The intermediate standards 16 are provided with bearings to receive the journals of upper and lower guide-rolls 17 and 18. The journals of the lower roll 18 are arranged in slots 19 of the standard 16 and are engaged by springs 20, which cause the rolls to engage a fabric yieldingly. The springs, which are substantially U-shaped, are composed of two arms and a connecting-coil, the lower arm of each spring being secured to the standard and the upper arm being arranged to engage beneath the journals 21, which are extended beyond the standards 16, as shown. The standards may be supported by inclined braces secured to them and to the base of the frame, as clearly shown in Fig. 1 of the accompanying drawings. The guide-rolls, which yieldingly engage the fabric being measured, prevent the same from being unrolled too rapidly.

In measuring material wound on spools a spool-receiving spindle 22 is provided. The ends of the spindle have indentations or sockets 23 and 24 to receive the journals, and one end is provided with a head 25, having opposite recesses 26 to receive the arms of the winding-shaft, whereby the spindle is interlocked with the same. A plain spindle having a socket at each end may be provided at the other end of the machine. The material after passing between the guide-rolls is carried beneath a measuring-wheel 27, which is located at a point between the said guide-rolls and the front end of the machine. The measuring-wheel, which is mounted on an upright or post 28, may have a circumference of one yard or any other unit of measure, and the material is held against its periphery by a yieldingly-mounted clenching-wheel 29, located beneath the measuring-wheel, as clearly shown in Figs. 1 and 2 of the accompanying drawings. The yieldingly-mounted wheel 29, which is provided at its periphery with a metal band 30, may be constructed of wood or any other suitable material, and it is mounted on a shaft or spindle extending beyond it to form journals 31, which operate in slots 32 of a bearing-frame 33, consisting of a bottom piece and vertical sides. The journals 31 are received in vertical movable bearings 34, interlocked with the bearing-frame at the edges of the vertical slots and engaged by coiled springs 35, which cause the wheel 29 to engage the measuring-wheel yieldingly.

The measuring-wheel is provided with a pair of tag-engaging jaws 36, located at opposite sides of the measuring-wheel and having shanks 37 hinged or pivoted between their ends at 38 and forming a pair of levers. These tag-engaging jaws are normally held against the faces of the measuring-wheel by springs 39 and 40, engaging the wheel 27 and the inner arms of the shanks or levers. One of the shanks or levers is bowed outwardly at 41, and the other shank or lever is provided with a transverse loop 42, which receives the outwardly-bowed portion 41 and which is arranged in guides 43. The guides 43, which are located at opposite sides of a slot or opening 44 of the wheel 27, consist of plates provided with notches or recesses, receiving the sides of the link.

The jaws are separated to disengage them from a tag by means of a reciprocating frame 45, provided at its inner end with a tapering arm or bar 46 and having a curved shoe 47 at its outer end. The tapering bar or arm, which is mounted in a guide 48, is adapted to be interposed between the outer end of the link and the bowed portion 41, whereby the inner arms of the shanks or levers will be forced in the direction of the wheels, and in order to enable the parts to work more freely the link is provided with an antifriction-sleeve 49. The guide 48 is located at one side of a loop or opening 50 of the reciprocating frame, which passes through a guide 51 at the other end of the loop 50, and the latter receives a coiled spring 52, which normally holds the reciprocating frame out of engagement with the arms or levers of the tag-engaging jaws. One end of the spring is connected with the reciprocating frame, and its other end bears against a stop 53, located within the opening 50 and provided with projections engaging the sides of the same.

During the rotation of the measuring-wheel the tag-engaging jaws are carried beneath a hopper or tag-receptacle 54, mounted on an arm or bracket 55 of the post or upright and adapted to receive a series of tags A, consecutively numbered, as indicated in Fig. 7 of the accompanying drawings by the characters $a'$ $a^2$ $a^3$, &c., and having prongs or points of wire or other material adapted to be passed through the fabric to be measured. The tags are delivered to the jaws with their prongs extending upwardly or outwardly, and they are carried by the clamping-jaws 36 on the measuring-wheel to the fabric, the prongs being passed through the same by the action of the said wheel 27 and being clenched by the lower yieldingly-mounted wheel 29. As the jaws leave the clenching-wheel they are spread or opened by reason of the curved shoe of the reciprocating frame coming in contact with a tripping-wheel 56, journaled on an arm or bracket 57 of the post or upright. The metal band provides a clenching-face, and it also spaces the measuring-wheel from the yieldingly-mounted wheel to prevent the jaws from binding against the peripheries of the same.

The hopper, which is open at its top and bottom, is provided at the latter with projections 58 and 59, engaging the periphery of the measuring-wheel and adapted to prevent more than one tag being delivered at one time to the same. A pair of projections 59 are located at the back of the hopper, and a single resilient projection 58 is located at the front side of the hopper, or where the tags leave the same, the prongs of the tag being adapted to pass outward at opposite sides of the projection 58 through slots 60. The hopper is also provided at opposite sides with T-shaped arms 61, depending below the periphery of the measuring-wheel and adapted to throw the jaws inward should they by any reason remain spread after the reciprocating frame has been withdrawn from between the outer end of the link and the bowed portion of the adjacent shank or lever.

The measuring-wheel is rotated by the fabric passing between it and the yieldingly-mounted lower wheel 29, the fabric being wound upon a board or spool at the front end of the machine as it is unwound from the rear end of the frame, and at each complete revolution of the measuring-wheel a tag is applied, and as the tags are consecutively numbered it will be apparent that the operator can ascertain at a glance the number of yards or other unit of length in a roll or bolt of material.

The invention has the following advantages: The measuring-machine, which is simple and comparatively inexpensive in construction, is positive and reliable in operation and is capable of accurately measuring a roll or bolt of material and of applying consecutively-numbered tags to the same, so that the number of yards in a piece of goods may be ascertained at a glance. The tags, which are delivered to the measuring-wheel one at a time, are provided with prongs, so as not to necessitate the employment of an adhesive substance, which might soil or otherwise injure the material, and the said tags have their prongs or points clenched before they are released by the jaws. The releasing device is positive and automatic in its operation, and as soon as the jaws begin to leave the clenching-wheel the shoe passes beneath the tripping-wheel, whereby the reciprocating frame is depressed to open the jaws. As soon as the shoe passes beyond the tripping-wheel the springs return the parts to their normal position.

In order to hold the tags firmly between the jaws, the latter are provided with inwardly-extending flanges 62, and the measuring disk or wheel is provided with a stop 63, located at the rear edges of the jaws and adapted to engage the rear edges of the tags. The flanges of the jaws are arranged at a slight angle to the periphery of the measuring-wheel to enable them to receive readily the tags.

Changes in the form, proportion, size, and the minor details of construction within the scope of the appended claims may be resorted to without departing from the spirit or sacrificing any of the advantages of this invention.

What is claimed is—

1. In a device of the class described, the combination of a hopper adapted to receive a number of tags, a measuring-wheel, a clenching-wheel operating contiguous to the measuring-wheel, and means mounted on the measuring-wheel for carrying a tag from the hopper to the clenching-wheel, whereby the tag will be applied to the fabric and will have its prongs or points clenched, substantially as described.

2. A device of the class described comprising a measuring-wheel, a hopper located adjacent to the same and adapted to receive the tags, jaws carried by the wheel and arranged to engage the tags automatically, and means for spreading the jaws, whereby the tag is released, substantially as described.

3. A device of the class described comprising a measuring-wheel, a hopper adapted to receive a series of tags, a clenching-wheel, jaws arranged at opposite sides of the measuring-wheel and adapted to engage a tag and carry the same from the hopper to the clenching-wheel, and means for spreading the jaws, whereby the tag is released, substantially as described.

4. A device of the class described comprising a measuring-wheel, a hopper or receptacle, a pair of spring-actuated jaws located at opposite sides of the measuring-wheel and adapted to engage the tags, a reciprocating device arranged to spread the jaws to release the tags, and a tripping device arranged to engage the reciprocating device, substantially as described.

5. A device of the class described comprising a measuring-wheel, a hopper or tag-receptacle, a pair of spring-actuated jaws located at opposite sides of the measuring-wheel and adapted to engage the tags, a reciprocating device arranged to spread the jaws, and provided with a shoe, and a tripping-wheel arranged to engage the shoe, substantially as described.

6. A device of the class described comprising a measuring-wheel, a hopper, a pair of spring-actuated jaws, a reciprocating spring-supported frame arranged to spread the jaws and provided with a curved shoe, and a tripping-wheel arranged to engage the shoe, substantially as described.

7. A device of the class described comprising a measuring-wheel, a pair of tag-engaging jaws, a reciprocating spring-supported device arranged to spread the jaws and provided with a shoe, a clenching-wheel, and a tripping-wheel located substantially diametrically opposite the clenching-wheel and adapted to engage the shoe as the jaws leave the clenching-wheel, substantially as described.

8. A device of the class described comprising a measuring-wheel, a pair of jaws provided with shanks or levers and mounted on the measuring-wheel at opposite sides thereof, one of the shanks or levers being extended outward, a link connected with the other shank or lever and receiving the said extended portion, springs for throwing the inner arms of the levers or shanks outward, a reciprocating device having a tapering bar or arm arranged to be interposed between the link and the extended portion of the adjacent shank or bar, and means for operating the reciprocating device, substantially as described.

9. A device of the class described comprising a measuring-wheel, a pair of spring-actuated tag-engaging jaws mounted thereon, a reciprocating frame provided with an opening, and having a shoe at one end, its other end being arranged to spread the jaws, a stop mounted on the wheel and arranged within the opening, and having projections, a spring interposed between the stop and the frame and located within the opening, and means for operating the frame, substantially as described.

10. A device of the class described comprising a measuring-wheel, jaws mounted thereon, means for operating the jaws, a hopper located at the periphery of the measuring-wheel and provided at its bottom with projections located at its front and back, the front projection being resilient, and a stop mounted on the wheel adjacent to the jaws, substantially as described.

11. A device of the class described comprising a measuring-wheel, jaws carried by the same, means for operating the jaws, and a tag-hopper having an open bottom and provided with slots to permit the passage of the points or prongs of the tag, substantially as described.

12. A device of the class described comprising a measuring-wheel, a pair of jaws, means for operating the same, a hopper located at the periphery of the wheel, and the depending T-shaped arms arranged at the sides of the hopper and extended beyond the periphery of the wheel, substantially as described.

13. A device of the class described comprising a measuring-wheel, a yieldingly-supported clenching-wheel provided with a peripheral band or portion forming a space between the adjacent portions of the yieldingly-mounted wheel and the measuring-wheel, jaws mounted on the measuring-wheel and having inwardly-extending portions, and means for operating the jaws, substantially as described.

14. A device of the class described comprising a frame, a measuring-wheel, tag-engaging jaws mounted on the measuring-wheel at the periphery thereof, a yieldingly-supported clenching-wheel located adjacent to the measuring-wheel, and guide-rollers for supporting the material to be measured, substantially as described.

15. In a device of the class described, the combination of a frame provided with a fixed standard, an adjustable standard provided at its lower end with an arm, journals or bearings arranged at opposite sides of the adjustable standards, and a fastening device adjustably securing the arm of the adjustable standard to the frame and forming a pivot to permit the said adjustable standard to be reversed and arranged contiguous to the fixed standard, substantially as described.

In testimony that we claim the foregoing as our own we have hereto affixed our signatures in the presence of two witnesses.

WILLIAM S. HUNT.
ORIN W. CLINE.

Witnesses:
J. O. THARNGREN,
O. W. HINMAN.